US012346048B2

(12) United States Patent
Kitajima et al.

(10) Patent No.: US 12,346,048 B2
(45) Date of Patent: Jul. 1, 2025

(54) IMAGE FORMING APPARATUS

(71) Applicant: FUJIFILM Business Innovation Corp., Tokyo (JP)

(72) Inventors: Katsuyuki Kitajima, Kanagawa (JP); Naoki Ota, Kanagawa (JP); Masataka Kuribayashi, Kanagawa (JP); Yusuke Fukuda, Kanagawa (JP); Yasuhisa Morooka, Kanagawa (JP); Tatsuhiro Igarashi, Kanagawa (JP); Teppei Yawada, Kanagawa (JP); Shota Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/664,642

(22) Filed: May 15, 2024

(65) Prior Publication Data

US 2025/0172895 A1 May 29, 2025

(30) Foreign Application Priority Data

Nov. 24, 2023 (JP) ................................ 2023-199418

(51) Int. Cl.
*G03G 15/00* (2006.01)
*G03G 9/087* (2006.01)
(Continued)

(52) U.S. Cl.
CPC ..... *G03G 15/5004* (2013.01); *G03G 9/08711* (2013.01); *G03G 15/5041* (2013.01);
(Continued)

(58) Field of Classification Search
CPC ........... G03G 15/5004; G03G 9/08711; G03G 15/5041; G03G 15/065; G03G 15/0907; G03G 2215/0648
See application file for complete search history.

(56) References Cited

U.S. PATENT DOCUMENTS

2013/0223861 A1* 8/2013 Kubo ................. G03G 15/0907 399/53
2014/0255062 A1* 9/2014 Hamaguchi .......... G03G 15/065 399/285
2019/0064719 A1* 2/2019 Tachi .................. G03G 15/065

FOREIGN PATENT DOCUMENTS

JP 2000-172043 A 6/2000
JP 2011-257534 A 12/2011

* cited by examiner

*Primary Examiner* — Sandra Brase
(74) *Attorney, Agent, or Firm* — Oliff PLC

(57) ABSTRACT

An image forming apparatus includes: an electrophotographic photoreceptor; a charging device that charges a surface of the electrophotographic photoreceptor; an electrostatic charge image-forming device that forms an electrostatic charge image on the charged surface of the electrophotographic photoreceptor; a developing device that stores a developer containing a toner, and supplies the developer to develop the electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in a rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage; a transfer device that transfers the toner image on the surface of the electrophotographic photoreceptor to a surface of a recording medium; a fixing (Continued)

device that fixes the toner image to the surface of the recording medium; and a control device that acquires image information regarding the toner image, and controls at least one of the first power source and the second power source according to the image information such that the AC voltage of the developing voltage applied to the second developing member has a lower frequency than the AC voltage of the developing voltage applied to the first developing member.

10 Claims, 3 Drawing Sheets

(51) Int. Cl.
*G03G 15/06* (2006.01)
*G03G 15/09* (2006.01)
(52) U.S. Cl.
CPC ....... *G03G 15/065* (2013.01); *G03G 15/0907* (2013.01); *G03G 2215/0648* (2013.01)

IMAGE FORMING APPARATUS

CROSS-REFERENCE TO RELATED APPLICATIONS

This application is based on and claims priority under 35 USC 119 from Japanese Patent Application No. 2023-199418 filed Nov. 24, 2023.

BACKGROUND

(i) Technical Field

The present disclosure relates to an image forming apparatus.

(ii) Related Art

Electrophotographic image formation involves, for example, charging the surface of a photoreceptor, then forming an electrostatic charge image on the surface of the photoreceptor according to image information, next developing the electrostatic charge image into a toner image by using a developer containing a toner, and transferring and fixing the toner image to the surface of a recording medium.

Japanese Unexamined Patent Application Publication No. 2000-172043 discloses a "color image forming apparatus that forms toner images of multiple colors on a latent image carrier that carries a latent image by using the latent image carrier and multiple developing units each having multiple developer carriers that carry and transport a developer and then transfers all of the toner images at once to a transfer material, wherein the multiple developing units each have a bias applying unit that applies an AC bias-superimposed DC bias to the corresponding developer carrier, the AC bias has a constant frequency, and the peak value of the AC bias applied to a developer carrier disposed upstream in the rotation direction of the latent image carrier is set higher than that of the AC bias applied to a developer carrier disposed downstream."

Japanese Unexamined Patent Application Publication No. 2011-257534 discloses a "developing device that includes: multiple toner carriers that carry a toner on their outer circumferential surfaces and are arranged along the rotation direction of an image carrier without contacting the image carrier; and a developer carrier that carries a developer containing the toner and a carrier and supplies the toner to the multiple toner carriers, wherein the toner is attached to an electrostatic latent image by an electric field formed between the voltage of the electrostatic latent image formed on the image carrier and an AC bias voltage applied to the toner carriers, and wherein the developing duty ratio of the AC bias voltage applied to a first toner carrier disposed upstream in the rotation direction of the image carrier is greater than that of the AC bias voltage applied to a second toner carrier disposed downstream in the rotation direction."

SUMMARY

One of known electrophotographic image forming apparatuses is an "image forming apparatus (hereinafter also referred to as a "specific image forming apparatus") that includes: an electrophotographic photoreceptor; a charging device that charges the surface of the electrophotographic photoreceptor; an electrostatic charge image-forming device that forms an electrostatic image on the charged surface of the electrophotographic photoreceptor; a developing device that stores a developer containing a toner, and supplies the developer to develop an electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in the rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage; a transfer device that transfers the toner image on the surface of the electrophotographic photoreceptor to the surface of a recording medium; and a fixing device that fixes the toner image to the surface of the recording medium (e.g., Japanese Unexamined Patent Application Publication Nos. 2000-172043 and 2011-257534).

However, for example, fine line reproducibility may deteriorate when the area coverage of toner images is as low as, for example, 40% or less.

Aspects of non-limiting embodiments of the present disclosure relate to a specific image forming apparatus that suppresses deterioration of fine line reproducibility, for example, in toner images having a low area coverage, compared with the case where the AC voltage of the developing voltage applied to the first developing member has the same frequency as the AC voltage of the developing voltage applied to the second developing member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including:

- an electrophotographic photoreceptor;
- a charging device that charges a surface of the electrophotographic photoreceptor;
- an electrostatic charge image-forming device that forms an electrostatic charge image on the charged surface of the electrophotographic photoreceptor;
- a developing device that stores a developer containing a toner, and supplies the developer to develop the electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in a rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage;

a transfer device that transfers the toner image on the surface of the electrophotographic photoreceptor to a surface of a recording medium;

a fixing device that fixes the toner image to the surface of the recording medium; and a control device that acquires image information regarding the toner image, and controls at least one of the first power source and the second power source according to the image information such that the AC voltage of the developing voltage applied to the second developing member has a lower frequency than the AC voltage of the developing voltage applied to the first developing member.

BRIEF DESCRIPTION OF THE DRAWINGS

Exemplary embodiments of the present disclosure will be described in detail based on the following figures, wherein.

DETAILED DESCRIPTION

Figure 1:
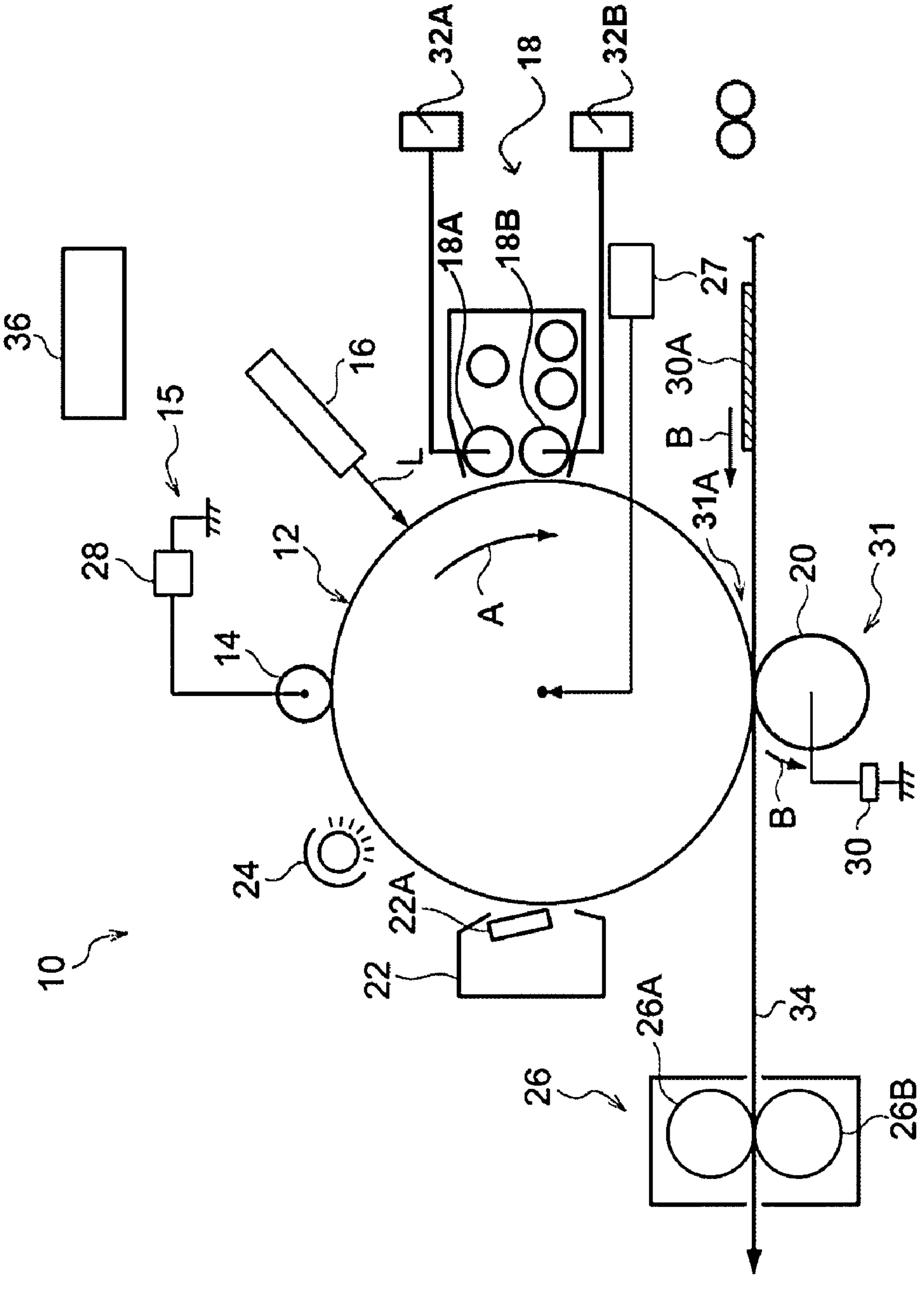
FIG. 1 is a schematic structural view of an example of an image forming apparatus according to an exemplary embodiment.

Exemplary embodiments of the present disclosure will be described below in detail.

Image Forming Apparatus

An image forming apparatus according to an exemplary embodiment includes:

an electrophotographic photoreceptor;

a charging device that charges a surface of the electrophotographic photoreceptor;

an electrostatic charge image-forming device that forms an electrostatic charge image on the charged surface of the electrophotographic photoreceptor;

a developing device that stores a developer containing a toner, and supplies the developer to develop the electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in a rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage;

a transfer device that transfers the toner image on the surface of the electrophotographic photoreceptor to a surface of a recording medium;

a fixing device that fixes the toner image to the surface of the recording medium; and a control device that acquires image information regarding the toner image, and controls at least one of the first power source and the second power source according to the image information such that the AC voltage of the developing voltage applied to the second developing member has a lower frequency than the AC voltage of the developing voltage applied to the first developing member.

The above structure of the image forming apparatus according to the exemplary embodiment suppresses deterioration of fine line reproducibility. The reason for this is assumed as described below.

An image forming apparatus known in the related art includes a developing device having multiple developing members (Japanese Unexamined Patent Application Publication Nos. 2000-172043 and 2011-257534). This image forming apparatus can ensure developing performance in high-speed printing. However, formation of an image having an area coverage as low as 40% or less may cause missing fine lines, resulting in low fine line reproducibility. This is because the toner developed by the first developing member returns to the second developing member due to the cohesive force of the toner when the AC voltage applied to the first developing member has the same frequency as the AC voltage applied to the second developing member disposed downstream of the first developing member in the rotation direction of the photoreceptor so as to face the photoreceptor. In particular, when the toner returns to the second developing member to cause toner voids, the toner voids are visually recognized because of less toner in fine lines, resulting in low line reproducibility.

In the image forming apparatus according to the exemplary embodiment, the control device acquires image information regarding a toner image, and controls at least one of the first power source and the second power source according to the image information such that the AC voltage of the developing voltage applied to the second developing member has a lower frequency than the AC voltage of the developing voltage applied to the first developing member.

This ensures the developing performance in the first developing member and lowers the developing performance in the second developing member to prevent the toner from returning to the second developing member.

This prevents or reduces toner voids in fine lines to suppress deterioration of fine line reproducibility.

As described above, the above structure of the image forming apparatus according to the exemplary embodiment may suppress deterioration of fine line reproducibility.

The image forming apparatus according to the exemplary embodiment may be a well-known image forming apparatus, such as a direct transfer-type apparatus in which a toner image formed on the surface of a photoreceptor is directly transferred to a recording medium; an intermediate transfer-type apparatus in which a toner image formed on the surface of a photoreceptor is first transferred to the surface of an intermediate transfer body, and the toner image, which has been transferred to the surface of the intermediate transfer medium, is second transferred to the surface of a recording medium; and an apparatus including a discharging device that discharges the surface of an photoreceptor by irradiating the surface of the photoreceptor with discharging light before charging after transfer of a toner image.

In an intermediate transfer-type apparatus, the transfer device includes, for example, an intermediate transfer body having the surface to which a toner image is transferred, a first transfer device that first transfers the toner image on the surface of the photoreceptor to the surface of the intermediate transfer body, and a second transfer device that second transfers the toner image, which has been transferred to the surface of the intermediate transfer body, to the surface of a recording medium.

In the image forming apparatus according to the exemplary embodiment, a section including at least the photoreceptor may constitute a unit for the image forming apparatus and may have a cartridge structure (i.e., process cartridge) that is attachable to and detachable from the image forming apparatus.

Examples of the unit for the image forming apparatus include a unit including a photoreceptor and a developing device.

Next, an example of the structure of the image forming apparatus according to the exemplary embodiment will be described in detail.

An example of the image forming apparatus according to the exemplary embodiment will be described below, but the image forming apparatus is not limited to this example. The main parts shown in the figure will be described, and other parts will not be described.

FIG. 1 is a schematic structural view of an example of the image forming apparatus according to the exemplary embodiment.

Referring to FIG. 1, an image forming apparatus 10 according to the exemplary embodiment includes, for example, a photoreceptor 12. The photoreceptor 12 has a cylindrical shape and is connected to a drive unit 27, such as a motor, through a driving force transmission member (not shown), such as a gear. The photoreceptor 12 is driven by the drive unit 27 to rotate about the rotation shaft indicated by the black dot. In the example illustrated in FIG. 1, the photoreceptor 12 is driven to rotate in the direction of the arrow A.

The photoreceptor 12 is surrounded by, for example, a charging device 15 (example charging device), an electrostatic charge image-forming device 16 (example electrostatic charge image-forming device), a developing device 18 (example developing device), a transfer device 31 (example transfer device), a cleaning device 22 (example cleaning device), and a discharging device 24, which are arranged in order in the rotation direction of the photoreceptor 12. The image forming apparatus 10 further includes a fixing device 26 having a fixing member 26A and a pressing member 26B disposed in contact with the fixing member 26A. The image forming apparatus 10 has a control device 36 that controls operation of each device (each unit). A unit including the photoreceptor 12, the charging device 15, the electrostatic charge image-forming device 16, the developing device 18, the transfer device 31, and the cleaning device 22 corresponds to the image forming unit.

The image forming apparatus 10 may include at least the photoreceptor 12 as a process cartridge integrated with another device.

Each device (each unit) of the image forming apparatus 10 will be described below in detail.

Electrophotographic Photoreceptor

The photoreceptor 12 has, for example, a conductive substrate, an undercoat layer on the conductive substrate, and a photosensitive layer on the undercoat layer. The photosensitive layer may have a two-layer structure including a charge generation layer and a charge transport layer.

The photosensitive layer may be an organic photosensitive layer or an inorganic photosensitive layer. The photoreceptor 12 may have a protective layer on the photosensitive layer.

Charging Device

The charging device 15 charges the surface of the photoreceptor 12. The charging device 15 includes, for example, a charging member 14 that is disposed in contact or non-contact with the surface of the photoreceptor 12 and charges the surface of the photoreceptor 12, and a power source 28 (example voltage applying unit for the charging member) that applies a charging voltage to the charging member 14. The power source 28 is electrically connected to the charging member 14.

Examples of the charging member 14 of the charging device 15 include contact-type chargers using, for example, a conductive charging roller, a charging brush, a charging film, a charging rubber blade, and a charging tube. Examples of the charging member 14 also include chargers known per se, such as contactless roller chargers, and scorotron chargers and corotron chargers using corona discharge.

In particular, when the charging member that charges the photoreceptor in a contactless manner is included as a charging device, the surface of the charging member is not contaminated with a lubricant.

Electrostatic Charge Image-Forming Device

The electrostatic charge image-forming device 16 forms an electrostatic charge image on the charged surface of the photoreceptor 12. Specifically, for example, the electrostatic charge image-forming device 16 irradiates the surface of the photoreceptor 12 charged by the charging member 14 with light L modulated on the basis of image information regarding an image to be formed to form an electrostatic charge image corresponding to the image of the image information on the photoreceptor 12.

Examples of the electrostatic charge image-forming device 16 include an optical device having a light source that imagewise exposes the surface to light, such as semiconductor laser light, LED light, or liquid crystal shutter light.

Developing Device

The developing device 18 is disposed, for example, downstream of the irradiation position of the light L from the electrostatic charge image-forming device 16 in the rotation direction of the photoreceptor 12. The developing device 18 contains a storage that stores a developer. In the storage, an electrostatic charge image developer having toner is stored. The toner is stored, for example, in a charged state in the developing device 18.

Figure 3:
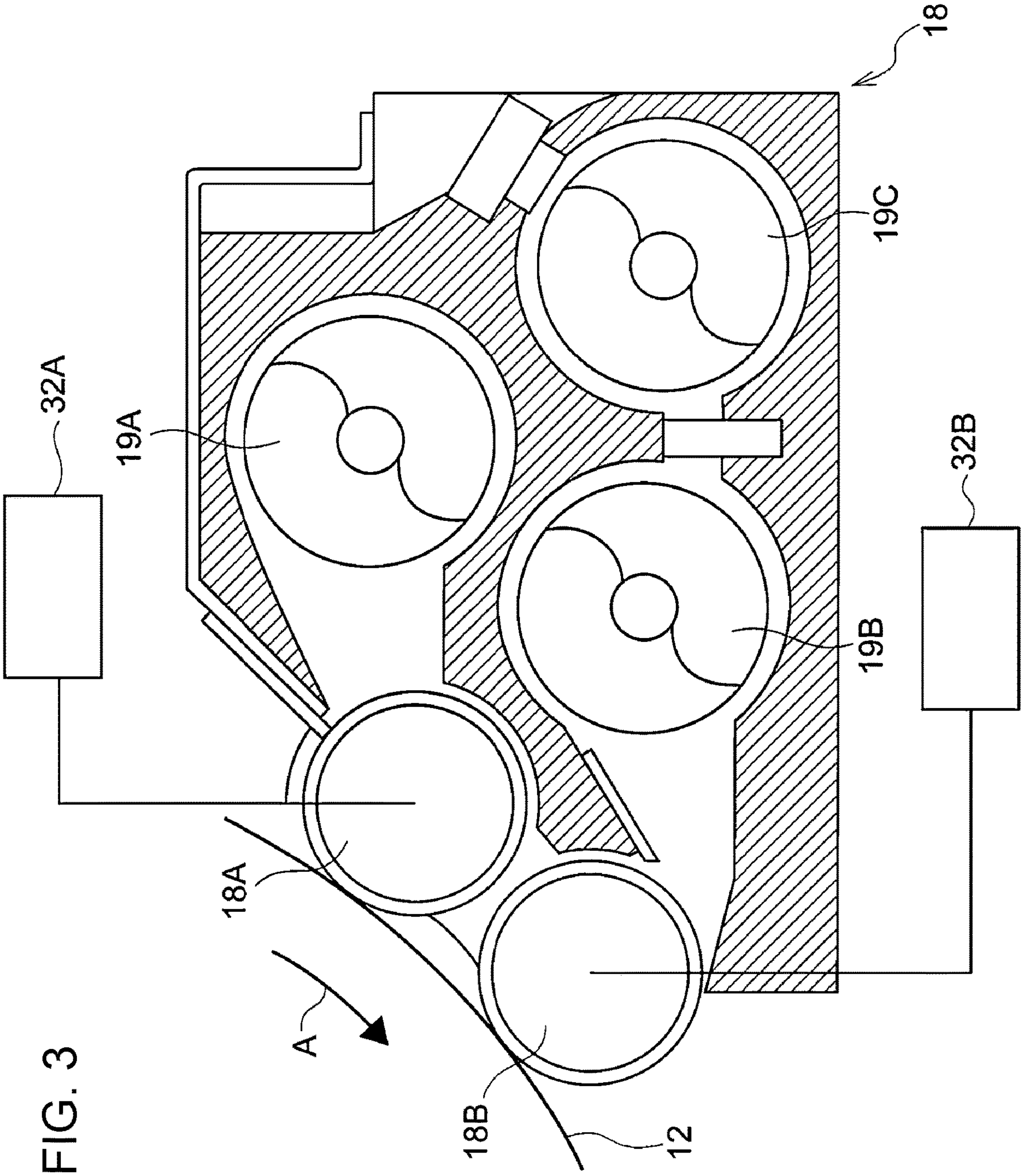
FIG. 3 is a schematic structural view of an example of a developing device of the image forming apparatus according to the exemplary embodiment.

The developing device 18 has: for example, a first developing member 18A that is disposed to face the photoreceptor 12, holds a developer, and transports the developer to a development region; and a second developing member 18B that is disposed downstream of the first developing member 18A in the rotation direction of the photoreceptor 12 so as to face the photoreceptor 12, holds the developer, and transports the developer to a development region (see FIG. 3).

The developing device 18 has a first power source 32A that applies, to the first developing member 18A, a developing voltage obtained by superimposing an AC voltage on a DC voltage, and a second power source 32B that applies, to the second developing member 18B, a developing voltage obtained by superimposing an AC voltage on a DC voltage (see FIG. 3).

In the developing device 18, a developer supply screw roller 19A on the right side of the first developing member 18A in the figure, and developer supply screw rollers 19B and 19C on the right side of the second developing member

18B are disposed such that the shafts of the developer supply screw rollers 19B and 19C are located at the vertices of a triangle (see FIG. 3).

Each screw roller is disposed in the corresponding developer supply transport path partitioned by a partition member.

The first developing member 18A and the second developing member 18B are connected to the first power source 32A and the second power source 32B, respectively.

Examples of the first developing member 18A and the second developing member 18B include a developing roller having a developing sleeve having a magnet therein.

The developing device 18 (first power source 32A and second power source 32B) is, for example, electrically connected to the control device 36 disposed in the image forming apparatus 10, and the first power source 32A and second power source 32B are driven and controlled by the control device 36 to apply developing voltages to the first developing member 18A and the second developing member 18B. The first developing member 18A and the second developing member 18B to which the developing voltages have been applied are charged to developing potentials corresponding to the respective developing voltages. The first developing member 18A and the second developing member 18B charged to the developing potentials hold, for example, on their surfaces, the developer stored in the developing device 18 and supply the toner contained in the developer to the surface of the photoreceptor 12 from the inside of the developing device 18. On the surface of the photoreceptor 12 to which the toner has been supplied, the formed electrostatic charge image is developed into a toner image.

In the developing device 18, the DC voltages applied to the first developing member 18A and the second developing member 18B are preferably in the range of 10 V to 800 V, more preferably in the range of 20 V to 650 V.

The AC voltage superimposed on the DC voltage in terms of peak-to-peak voltage is preferably in the range of 200 V to 2000 V, more preferably in the range of 300 V to 1500 V.

The frequency of the AC voltage superimposed on the DC voltage is preferably in the range of 2 kHz to 20 kHz, more preferably in the range of 3 kHz to 18 KHz.

Transfer Device

The transfer device 31 is disposed, for example, downstream of the position of the developing device 18 in the rotation direction of the photoreceptor 12. The transfer device 31 includes, for example, a transfer member 20 that transfers the toner image on the surface of the photoreceptor 12 to a recording medium 30A, and a power source 30 that applies a transfer voltage to the transfer member 20. The transfer member 20 has, for example, a cylindrical shape, and transports the recording medium 30A sandwiched between the transfer member 20 and the photoreceptor 12. The transfer member 20 is, for example, electrically connected to the power source 30.

Examples of the transfer member 20 include contact-type transfer chargers using a belt, a roller, a film, or a rubber cleaning blade; and contactless transfer chargers known per se, such as scorotron transfer chargers and corotron transfer chargers using corona discharge.

The transfer device 31 (including the power source 30) is, for example, electrically connected to the control device 36 disposed in the image forming apparatus 10, and the transfer device 31 is driven and controlled by the control device 36 so that a transfer voltage is applied to the transfer member 20. The transfer member 20 to which the transfer voltage has been applied is charged to a transfer potential corresponding to the transfer voltage.

When a transfer voltage having a polarity opposite to that of the toner constituting the toner image on the photoreceptor 12 is applied to the transfer member 20 from the power source 30 for the transfer member 20, for example, a transfer electric field having an electric field strength that moves each toner constituting the toner image on the photoreceptor 12 from the photoreceptor 12 to the transfer member 20 side by means of electrostatic force is formed in a region (see a transfer region 31A in FIG. 1) where the photoreceptor 12 and the transfer member 20 face each other.

The recording medium 30A is, for example, stored in a storage (not shown) and transported along a transport path 34 from the storage by multiple transport members (not shown) to reach the transfer region 31A, which is a region where the photoreceptor 12 and the transfer member 20 face each other. In the example illustrated in FIG. 1, the recording medium 30A is transferred in the direction of the arrow B. The toner image on the photoreceptor 12 is, for example, transferred to the recording medium 30A, which has reached the transfer region 31A, by the transfer electric field formed in the region by applying the transfer voltage to the transfer member 20. In other words, for example, the toner image is transferred onto the recording medium 30A as the toner moves from the surface of the photoreceptor 12 to the recording medium 30A. The toner image on the photoreceptor 12 is transferred onto the recording medium 30A by the transfer electric field.

Cleaning Device

The cleaning device 22 is disposed downstream of the transfer region 31A in the rotation direction of the photoreceptor 12. The cleaning device 22 cleans the residual toner on the photoreceptor 12 after the toner image is transferred to the recording medium 30A. The cleaning device 22 cleans deposits, such as paper dust, in addition to the residual toner.

The cleaning device 22 has a cleaning blade 22A and removes deposits on the surface of the photoreceptor 12 by bringing the edge of the cleaning blade 22A into contact with the photoreceptor 12 such that the edge of the cleaning blade 22A faces in the direction opposite to the rotation direction of the photoreceptor 12.

Discharging Device

The discharging device 24 is disposed, for example, downstream of the cleaning device 22 in the rotation direction of the photoreceptor 12. The discharging device 24 exposes the surface of the photoreceptor 12 to light to discharge the surface of the photoreceptor 12 after the toner image is transferred. Specifically, for example, the discharging device 24 is electrically connected to the control device 36 disposed in the image forming apparatus 10, and the discharging device 24 is driven and controlled by the control device 36 to expose the entire surface of the photoreceptor 12 (specifically, for example, the entire surface of the image formation region) to light to discharge the entire surface of the photoreceptor 12.

Examples of the discharging device 24 include devices having a light source, such as a tungsten lamp that emits white light, or a light emitting diode (LED) that emits red light.

Fixing Device

The fixing device 26 is disposed, for example, downstream of the transfer region 31A in the transport direction of the recording medium 30A in the transport path 34. The fixing device 26 has the fixing member 26A and the pressing member 26B in contact with the fixing member 26A, and fixes the toner image, which has been transferred onto the recording medium 30A, in a contact area between the fixing member 26A and the pressing member 26B. Specifically, for example, the fixing device 26 is electrically connected to the control device 36 disposed in the image forming apparatus 10, and the fixing device 26 is driven and controlled by the control device 36 to fix the toner image, which has been transferred onto the recording medium 30A, to the recording medium 30A by means of heat and pressure.

Examples of the fixing device 26 include fixers known per se, such as heat roller fixers and oven fixers.

Specifically, for example, the fixing device 26 is a well-known fixing device including a fixing roller or fixing belt as the fixing member 26A and a pressure roller or pressure belt as the pressing member 26B.

The recording medium 30A to which the toner image has been transferred by the recording medium 30A being transported along the transport path 34 and passing through the region (transfer region 31A) where the photoreceptor 12 and the transfer member 20 face each other is, for example, further transported to the installation position of the fixing device 26 along the transport path 34 by the transport member (not shown), and the toner image on the recording medium 30A is fixed.

The recording medium 30A on which the image has been formed by fixing the toner image is ejected to the outside of the image forming apparatus 10 by multiple transport members (not shown). The photoreceptor 12 is charged to a charging potential again by the charging device 15 after being discharged by the discharging device 24.

Control Device

Figure 2:
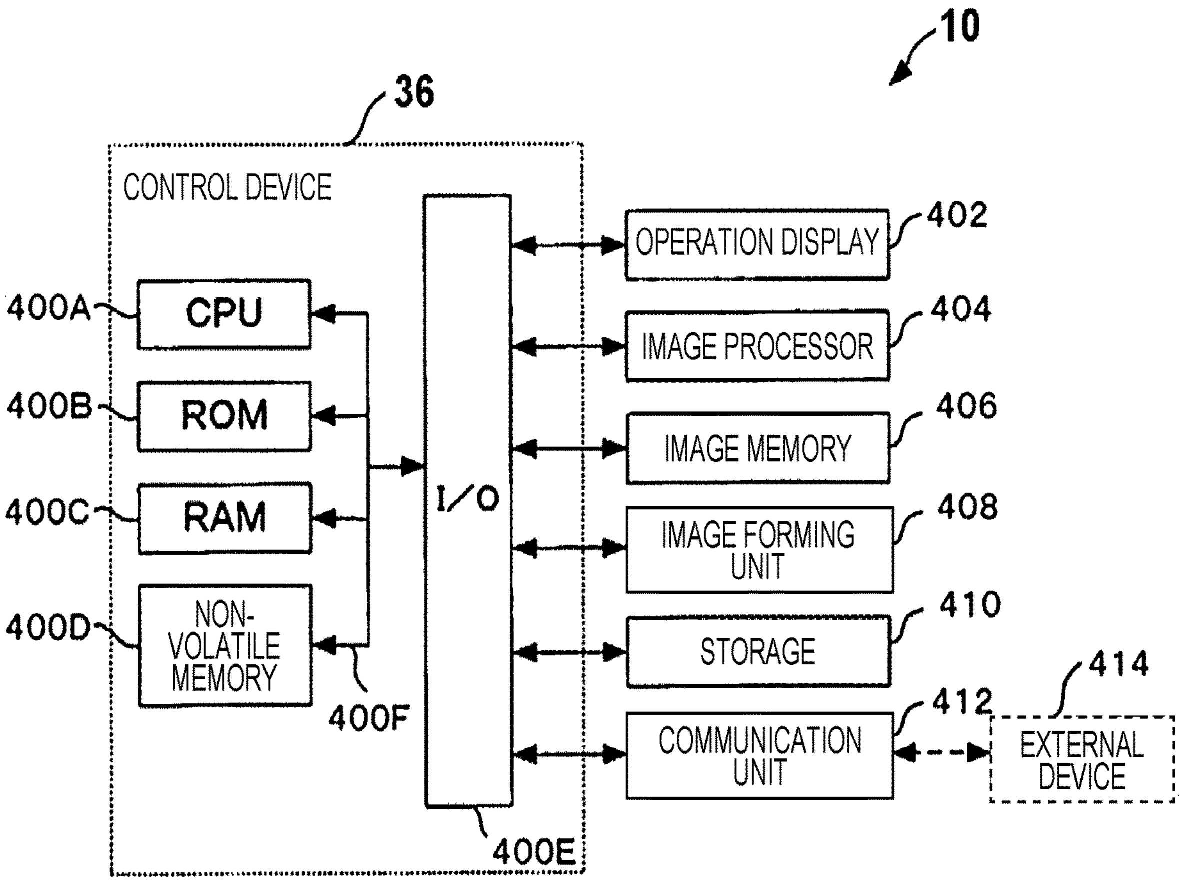
FIG. 2 is a schematic structural view of an example of a control system of the image forming apparatus according to the exemplary embodiment.

Next, an example of the configuration of the control system of the image forming apparatus 10 will be described with reference to FIG. 2.

The image forming apparatus 10 has the control device 36 that controls operation of each device (each unit).

The control device 36 is configured as a computer that controls the entire apparatus and performs various calculations. Specifically, referring to FIG. 2, the control device 36 includes a central processing unit (CPU) 400A, a read only memory (ROM) 400B that stores various programs, a random access memory (RAM) 400C used as a work area during execution of programs, a non-volatile memory 400D that stores various types of information, and an input/output interface (I/O) 400E. The CPU 400A, the ROM 400B, the RAM 400C, the non-volatile memory 400D, and the I/O 400E are connected to each other through a bus 400F.

The image forming apparatus 10 includes an operation display 402, an image processor 404, an image memory 406, an image forming unit 408, a storage 410, and a communication unit 412 outside the control device 36. The operation display 402, the image processor 404, the image memory 406, the image forming unit 408, the storage 410, and the communication unit 412 are connected to the I/O 400E in the control device 36. The control device 36 exchanges information with each of the operation display 402, the image processor 404, the image memory 406, the image forming unit 408, the storage 410, and the communication unit 412 and controls each of these units.

The operation display 402 includes various buttons, such as a start button and a numeric keypad, a touch panel for displaying various screens, such as a warning screen and a setting screen, and other components. Having the above structure, the operation display 402 receives operations from users and displays various types of information to users.

The image processor 404 performs predetermined image processing on image information acquired from an external device 414 through the communication unit 412 to generate image information to be outputted to the image forming unit 408. For example, the PDL data written in page description language is developed and converted into raster data (RGB data) developed in RGB colors, and the RGB data is subjected to color conversion to generate, for example, YMCK data expressed in colors reproduced by the image forming apparatus. Furthermore, screen processing, gamma correction processing, or other processing may also be performed.

The image memory 406 stores various types of image information acquired in the image forming apparatus 10, such as image information acquired from the external device 414, and image information generated by the image processor 404. The image memory 406 stores, for example, at least image information obtained after image processing in the image processor 404, that is, image information to be outputted to the image forming unit 408.

The image forming unit 408 is described as a main component of the image forming apparatus 10. The image forming unit 408 includes, for example, the photoreceptor 12 (drive unit thereof (not shown)), the charging device 15, the electrostatic charge image-forming device 16, the developing device 18, the transfer device 31, the discharging device 24, and the fixing device 26. Each of these units is connected to the control device 36. The control device 36 exchanges information with each of these units and controls each of these units and other units.

The storage 410 includes a storage device, such as a hard disk. The storage 410 stores, for example, various data, such as log data, and various programs.

The communication unit 412 is an interface for communication with the external device 414 through a wired or wireless communication line. For example, the communication unit 412 acquires, from the external device 414, image forming information together with image information regarding image forming instructions or electronic documents. The image forming information includes parameters representing attributes, such as the type (i.e., size) of recording paper P, the paper feeding direction of recording paper P, the number of copies, and the color mode.

Various drives may be connected to the control device 36. Various drives are devices for reading data from computer-readable portable recording media, such as flexible disks, magneto-optical disks, CD-ROMs, DVD-ROMs, and USB memories, or writing data on recording media. When various drives are connected to the control device 36, control programs may be recorded in a portable recording medium and executed by the corresponding drive reading the programs.

Operations of Image Forming Apparatus

An example of the operations of the image forming apparatus 10 according to the exemplary embodiment will be described. Each operation of the image forming apparatus 10 is carried out by the control programs executed in the control device 36.

In the image forming apparatus 10, for example, control programs for "image forming processing" and "development condition changing processing" are previously stored in the ROM 400B. The previously stored control programs are read out by the CPU 400A and executed using the RAM 400C as a work area. In the image forming apparatus 10, for example, various data, such as "image forming conditions (various process control values)," are previously stored in the non-volatile memory 400D.

The control programs and various data may be stored in another storage device, such as the ROM 400B, the non-volatile memory 400D, or the storage 410, or may be acquired from the outside through the communication unit 412.

The image forming operation of the image forming apparatus 10 will be described.

First, the surface of the photoreceptor 12 is charged by the charging device 15. The electrostatic charge image-forming device 16 exposes the charged surface of the photoreceptor 12 to light on the basis of image information. The electrostatic charge image corresponding to the image information is thus formed on the photoreceptor 12. In the developing device 18, the electrostatic charge image formed on the surface of the photoreceptor 12 is developed by using the developer containing a toner. The toner image is thus formed on the surface of the photoreceptor 12.

In the transfer device 31, the toner image formed on the surface of the photoreceptor 12 is transferred to the recording medium 30A. The toner image that has been transferred to the recording medium 30A is fixed by the fixing device 26.

The surface of the photoreceptor 12 after transfer of the toner image is cleaned with the cleaning blade 22A in the cleaning device 22 and then discharged by the discharging device 24.

In the image forming apparatus 10, the control device 36 executes control to change the development conditions of the developing device 18 when the control device 36 determines that the image has poor toner image reproducibility during the image forming operation.

The operation for changing the development conditions of the developing device 18 will be described. The operation for changing the development conditions of the developing device 18 is performed by the control program for "development condition changing processing" executed in the control device 36. The control program for "development condition changing processing" starts, for example, when the developing device 18 receives image forming instructions or other instructions from the operation display 402 or from the external device 414 through the communication unit 412.

First, the image information regarding the toner image is acquired in the development condition changing processing.

Examples of the method for acquiring the image information include, but are not limited to, a method of reading the toner image on recording paper P by using a reading device (not shown), and a method of acquiring the image information regarding an image to be formed.

The image information for determining that the image has poor toner image reproducibility may be information regarding image area coverage. The image area coverage is the area ratio of the formed image to the area of the surface (image-formed surface) of recording paper P (example recording medium).

Next, whether the image has poor image reproducibility is determined from the acquire toner image information in the development condition changing processing.

For example, when the image reproducibility of fine lines is poor in an image having an area coverage of 40% or less and when the area coverage of the acquired toner image is determined to be 40% or less, at least one of the first power source 32A and the second power source 32B is controlled such that the AC voltage of the developing voltage applied to the second developing member has a lower frequency than the AC voltage of the developing voltage applied to the first developing member in the development condition changing processing from a state where the AC voltages applied to the first developing member 18A and the second developing member 18B have the same frequency.

Specific aspects of the way for the control device 36 to change the frequency are as described below.

Aspect 1: The second power source 32B is controlled to reduce the frequency of the AC voltage of the developing voltage applied to the second developing member 18B such that the AC voltage of the developing voltage applied to the second developing member 18B has a lower frequency than the AC voltage of the developing voltage applied to the first developing member 18A.

Aspect 2: The second power source 32B is controlled to increase the frequency of the AC voltage of the developing voltage applied to the first developing member 18A such that the AC voltage of the developing voltage applied to the second developing member 18B has a lower frequency than the AC voltage of the developing voltage applied to the first developing member 18A.

Aspect 3: A combination of Aspect 1 and Aspect 2.

Aspect 1 may be employed to suppress deterioration of fine line reproducibility while maintaining developing performance.

The ratio (Fd/Fu) of the frequency Fd of the AC voltage of the developing voltage applied to the first developing member 18A to the frequency Fu of the AC voltage of the developing voltage applied to the second developing member 18B is, for example, 1.7 or more and 10.0 or less (preferably 2.0 or more and 9.0 or less, more preferably 3.0 or more and 6 or less).

When the ratio (Fd/Fu) is in the above range, it may be easy to suppress deterioration of fine line reproducibility while maintaining developing performance.

If it is determined that the acquired toner image is not an image having poor image reproducibility in the development condition changing processing, the development conditions return to the initial settings (i.e., the AC voltage of the developing voltage applied to the first developing member has the same frequency as the AC voltage of the developing voltage applied to the second developing member, or other cases).

Each process executed by the CPU reading software (i.e., program) in each of the above exemplary embodiments may be executed by various processors other than the CPU. Examples of the processors in this case include programmable logic devices (PLDs) of which the circuit can be reconfigured after manufacturing, such as field-programmable gate arrays (FPGAs); and dedicated electrical circuits that are processors having circuit configurations specifically designed to execute a specific process, such as application-specific integrated circuits (ASICs). Each process may be executed by one of these processors, or may be executed by a combination of two or more of the same or different types of processors (e.g., two or more FPGAs, and a combination of CPU and FPGA). More specifically, the hardware structure of each of these processors is an electric circuit composed of a combination of circuit elements, such as semiconductor elements.

The aspect where each program is previously stored (i.e., installed) in the ROM or the non-volatile memory is described, but the present disclosure is not limited to this aspect. The programs may be provided while being recorded in a recording medium, such as a Compact Disc Read-Only Memory (CD-ROM), Digital Versatile Disk-Read Only Memory (DVD-ROM), and a Universal Serial Bus (USB) memory. The programs may be downloaded from an external device through a network.

The aspect where the area coverage is acquired as image information in the development condition changing processing is described. However, the thickness of fine line images may be acquired as image information in the development condition changing processing.

In other words, the development condition changing processing may be executed according to the thickness of fine line images (e.g., when image information that the fine line images have thicknesses of 2 dots or less and 1 dot or more is acquired).

Electrostatic Charge Image Developer

Next, the electrostatic charge image developer (hereinafter also referred to as an "electrostatic charge image developer according to the exemplary embodiment") stored in the developing device in the image forming apparatus according to the exemplary embodiment will be described.

The electrostatic charge image developer according to the exemplary embodiment contains at least a toner.

The electrostatic charge image developer according to the exemplary embodiment may be a one-component developer containing only a toner, or may be a two-component developer containing a toner and a carrier.

The toner contains toner particles. The toner may contain toner particles and external additives.

The adhesion force of the toner may be 5 MPa or more and 15 MPa or less.

If the adhesion force of the toner is as high as the above range, it is difficult to separate the toner from the carrier or the photoreceptor, and the developing performance tends to deteriorate. It is therefore easy to degrade fine line reproducibility when forming a toner image having, for example, an area coverage of 40% or less. In particular, high cohesive force between toner particles tends to cause the phenomenon in which the toner returns to the second developing member in the image forming apparatus including the developing device having multiple developing members and tends to cause deterioration of fine line reproducibility.

The adhesion force of the toner is measured in the following manner.

A horizontal bar chart image having an area coverage of 5% is printed on 500 sheets of A4 paper by using a Docu Centre Color 450 copier (available from FUJIFILM Business Innovation), and a patch image of 10 mm×100 mm is applied onto the photoreceptor such that the development toner amount is 4.0 g/$m^2$ and developed. The image formation is carried out in an environment with a temperature of 25° C. and a humidity of 50%.

Next, an air blow nozzle having an opening diameter of 0.5 mm is disposed at a distance of 10 mm from the surface of the photoreceptor, and air is blown perpendicular to the patch image while the air pressure increases at a rate of 0.1 Pa/s. The air pressure at the time when the image peels off to expose the surface of the photoreceptor is defined as an adhesion force.

The air pressure is measured by disposing AP-V80 (available from Keyence Corporation) in a flow path at a position 10 cm upstream from the tip of the blow nozzle.

The toner having high adhesion force, which has poor releasability, does not peel off unless the air is blown at strong air pressure; whereas the toner having low adhesion force peels off even at low air pressure.

Aspects where the adhesion force of the toner is as high as the above range are as described below.

Aspect 1: The toner has toner particles containing a binder resin and resin particles.

Aspect 2: The amount of the resin particles is 3 mass % or more and 25 mass % or less relative to the toner particles.

Aspect 3: The resin particles are made of a styrene (meth)acrylic resin.

Aspect 4: The resin particles have an average primary particle size of 20 nm or more and 300 nm or less.

The toner will be described below in detail.

Toner Particles

The toner particles contain, for example, a binder resin. The toner particles may contain a colorant, a release agent, resin particles, and other additives.

Binder Resin

Examples of the binder resin include vinyl resins composed of a homopolymer of a monomer or a copolymer of two or more monomers selected from, for example, styrenes (e.g., styrene, p-chlorostyrene, α-methylstyrene), (meth) acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the binder resin also include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of vinyl monomers in the presence of these non-vinyl resins.

These binder resins may be used singly or in combination of two or more.

The binder resin may be a polyester resin.

Examples of the polyester resin include known amorphous polyester resins. The polyester resin may be a combination of an amorphous polyester resin and a crystalline polyester resin. The crystalline polyester resin may be used in the range of 2 mass % or more and 40 mass % or less (preferably 2 mass % or more and 20 mass % or less) relative to the entire binder resin.

The term "crystalline" for resin means that the resin shows a distinct endothermic peak rather than stepwise endothermic changes in differential scanning calorimetry (DSC) and specifically means that the full width at half maximum of the endothermic peak measured at a heating rate of 10° C./min is within 10° C.

The term "amorphous" for resin means that the resin shows a full width at half maximum of more than 10° C., shows stepwise endothermic changes, or shows no distinct endothermic peak.

Amorphous Polyester Resin

Examples of the amorphous polyester resin include a polycondensation polymer of a polycarboxylic acid and a polyhydric alcohol. The amorphous polyester resin may be a commercial product or a synthetic product.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Of these, the polycarboxylic acid may be, for example, an aromatic dicarboxylic acid.

The polycarboxylic acid may be a combination of a dicarboxylic acid and a trivalent or higher valent carboxylic acid having a cross-linked structure or branched structure. Examples of the trivalent or higher valent carboxylic acid include trimellitic acid, pyromellitic acid, anhydrides thereof, and lower (e.g., C1 to C5) alkyl esters thereof.

The polycarboxylic acids may be used singly or in combination of two or more.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Of these, the polyhydric alcohol is preferably, for example, an aromatic diol or an alicyclic diol, more preferably an aromatic diol.

The polyhydric alcohol may be a combination of a diol and a trihydric or higher polyhydric alcohol having a cross-linked structure or branched structure. Examples of the trihydric or higher polyhydric alcohol include glycerol, trimethylolpropane, and pentacrythritol.

The polyhydric alcohols may be used singly or in combination of two or more.

The glass transition temperature (Tg) of the amorphous polyester resin is preferably 50° C. or higher and 80° C. or lower, more preferably 50° C. or higher and 65° C. or lower.

The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121-1987 "Testing Methods for Transition Temperatures of Plastics".

The weight average molecular weight (Mw) of the amorphous polyester resin is preferably 5,000 or more and 1,000,000 or less, more preferably 7,000 or more and 500,000 or less.

The number average molecular weight (Mn) of the amorphous polyester resin is preferably 2,000 or more and 100,000 or less.

The molecular weight distribution Mw/Mn of the amorphous polyester resin is preferably 1.5 or more and 100 or less, more preferably 2 or more and 60 or less.

The weight average molecular weight and the number average molecular weight are determined by gel permeation chromatography (GPC). The determination of the molecular weight by GPC is carried out by using a GPC HLC-8120 GPC available from Tosoh Corporation as a measuring system, a column TSKgel SuperHM-M (15 cm) available from Tosoh Corporation, and a THF solvent. The weight average molecular weight and the number average molecular weight are calculated from the molecular weight calibration curve created on the basis of the measurement results by using a monodisperse polystyrene standard.

The amorphous polyester resin is produced by using a well-known production method. Specifically, for example, the amorphous polyester resin is produced by using a method involving causing reaction at a polymerization temperature of 180° C. or higher and 230° C. or lower and, as desired, under reduced pressure in a reaction system while removing water and alcohol generated during condensation.

If the monomers used as materials are neither dissolved in nor compatible with each other at the reaction temperature, the monomers may be dissolved by adding a solvent with a high boiling point as a solubilizer. In this case, the polycondensation reaction is carried out while the solubilizer is distilled off. If a monomer with poor compatibility is present, the monomer with poor compatibility is previously subjected to condensation with an acid or alcohol that is to undergo polycondensation with the monomer, and the resulting condensate is then subjected to polycondensation with a main component.

Crystalline Polyester Resin

Examples of the crystalline polyester resin include a polycondensate of a polycarboxylic acid and a polyhydric alcohol. The crystalline polyester resin may be a commercial product or a synthetic product.

The crystalline polyester resin may be a polycondensate produced by using a straight-chain aliphatic polymerizable monomer rather than an aromatic polymerizable monomer in order to easily form a crystal structure.

Examples of the polycarboxylic acid include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), anhydrides thereof, and lower (e.g., C1 to C5) alkyl esters thereof.

The polycarboxylic acid may be a combination of a dicarboxylic acid and a trivalent or higher valent carboxylic acid having a cross-linked structure or branched structure. Examples of the trivalent carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (e.g., C1 to C5) alkyl esters thereof.

The polycarboxylic acid may be a combination of these dicarboxylic acids and a dicarboxylic acid having a sulfonic acid group or a dicarboxylic acid having an ethylenic double bond.

The polycarboxylic acids may be used singly or in combination of two or more.

Examples of the polyhydric alcohol include aliphatic diols (e.g., straight-chain aliphatic diols having 7 to 20 carbon atoms in the main chain). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol. Of these, 1,8-octanediol, 1,9-nonanediol, and 1,10-decanediol may be used as aliphatic diols.

The polyhydric alcohol may be a combination of a diol and a trihydric or higher polyhydric alcohol having a cross-linked structure or branched structure. Examples of the trihydric or higher polyhydric alcohol include glycerol, trimethylolethane, trimethylolpropane, and pentaerythritol.

The polyhydric alcohols may be used singly or in combination of two or more.

The polyhydric alcohol preferably includes 80 mol % or more of an aliphatic diol, more preferably includes 90 mol % or more of an aliphatic diol.

The melting temperature of the crystalline polyester resin is preferably 50° C. or higher and 100° C. or lower, more preferably 55° C. or higher and 90° C. or lower, still more preferably 60° C. or higher and 85° C. or lower.

The melting temperature is determined from the differential scanning calorimetry (DSC) curve obtained by DSC in accordance with "melting peak temperature" described in the method for determining the melting temperature in JIS K 7121-1987 "Testing Methods for Transition Temperatures of Plastics".

The weight average molecular weight (Mw) of the crystalline polyester resin is preferably 6,000 or more and 35,000 or less.

Like the amorphous polyester, the crystalline polyester resin is produced by, for example, a well-known production method.

The amount of the binder resin relative to the total mass of the toner particles is, for example, preferably 40 mass % or more and 95 mass % or less, more preferably 50 mass % or more and 90 mass % or less, still more preferably 60 mass % or more and 85 mass % or less.

Colorant

Examples of the colorant include various pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and various dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used singly or in combination of two or more.

The colorant may be surface-treated as desired, or may be used in combination with a dispersant. Two or more colorants may be used in combination.

The amount of the colorant relative to the total mass of the toner particles is, for example, preferably 1 mass % or more and 30 mass % or less, more preferably 3 mass % or more and 15 mass % or less.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, more preferably 60° C. or higher and 100° C. or lower.

The melting temperature is determined from the differential scanning calorimetry (DSC) curve obtained by DSC in accordance with "melting peak temperature" described in the method for determining the melting temperature in JIS K 7121-1987 "Testing Methods for Transition Temperatures of Plastics".

The amount of the release agent relative to the total mass of the toner particles is, for example, preferably 1 mass % or more and 20 mass % or less, more preferably 5 mass % or more and 15 mass % or less.

Resin Particles

Examples of the resin particles include resin particles made of polyolefin resins (e.g., polyethylene, polypropylene), styrene resins (e.g., polystyrene, α-polymethylstyrene), (meth)acrylic resins (e.g., polymethyl methacrylate, polyacrylonitrile), epoxy resin, polyurethane resin, polyurea resin, polyamide resin, polycarbonate resin, polyether resin, polyester resin, copolymer resins thereof, and other resins.

The resin particles may be styrene-(meth)acrylic copolymer resin particles.

Examples of styrene-(meth)acrylic copolymer resin particles include resin particles produced by polymerizing a styrene monomer and a (meth)acrylic acid monomer through radical polymerization.

Examples of the styrene monomer include styrene; alkylated styrenes having an alkyl chain, such as α-methylstyrene, vinylnaphthalene, 2-methylstyrene, 3-methylstyrene, 4-methylstyrene, 2-ethylstyrene, 3-ethylstyrene, and 4-ethylstyrene; and halogenated styrenes, such as 2-chlorostyrene, 3-chlorostyrene, 4-chlorostyrene; and fluorinated styrenes, such as 4-fluorostyrene and 2,5-difluorostyrene. Of these, styrene and a-methylstyrene may be used as the styrene monomer.

Examples of the (meth)acrylic acid monomer include (meth)acrylic acid, n-methyl (meth)acrylate, n-ethyl (meth) acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, phenyl (meth)acrylate, biphenyl (meth)acrylate, diphenylethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth)acrylate, diethylaminocthyl (meth)acrylate, methoxyethyl (meth) acrylate, 2-hydroxyethyl (meth)acrylate, β-carboxyethyl (meth)acrylate, (meth)acrylonitrile, and (meth)acrylamide. Of these, n-butyl (meth)acrylate and β-carboxyethyl (meth) acrylate may be used as the (meth)acrylic acid monomer.

The resin particles may be cross-linked resin particles. Examples of the cross-linker for cross-linking the resin in the cross-linked resin particles include aromatic polyvinyl compounds, such as divinylbenzene and divinylnaphthalene; polyvinyl esters of aromatic polycarboxylic acids, such as divinyl phthalate, divinyl isophthalate, divinyl terephthalate, divinyl homophthalate, divinyl trimesate, trivinyl trimesate, divinyl naphthalene dicarboxylate, and divinyl biphenylcarboxylate; divinyl esters of nitrogen-containing aromatic compounds, such as divinyl pyridinedicarboxylate; vinyl esters of unsaturated heterocyclic compound carboxylic acids, such as vinyl pyromucate, vinyl furoate, vinyl pyrrole-2-carboxylate, and vinyl thiophenecarboxylate; (meth)acrylic acid esters of linear polyhydric alcohols, such as butanediol methacrylate, hexanediol acrylate, octanediol methacrylate, decanediol acrylate, and dodecanediol methacrylate; (meth)acrylic acid esters of branched and substituted polyhydric alcohols, such as neopentyl glycol dimethacrylate, 2-hydroxy-1,3-diacryloxypropane; polyethylene glycol di(meth)acrylate; polypropylene polyethylene glycol di(meth)acrylate; and polyvinyl esters of polycarboxylic acids, such as divinyl succinate, divinyl fumarate, vinyl maleate, divinyl maleate, divinyl diglycolate, vinyl itaconate, divinyl itaconate, divinyl acetonedicarboxylate, divinyl glutarate, divinyl 3,3'-thiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate. These cross-linkers may be used singly or in combination of two or more.

Examples of resin particles that easily increase the adhesion force of the toner include (meth)acrylic resin particles.

Examples of (meth)acrylic resin particles include homopolymer resin particles containing only (meth)acrylic acid monomers, and copolymer resin particles containing styrene monomers and (meth)acrylic acid monomers.

Examples of homopolymer resin particles containing only (meth)acrylic acid monomers include homopolymer particles of monomers, such as polymethyl methacrylate and polyethyl acrylate.

Examples of copolymer resin particles containing styrene monomers and (meth)acrylic acid monomers include copolymer resin particles containing styrene as a styrene monomer and n-butyl acrylate as a (meth)acrylic acid monomer, wherein the mass ratio of the styrene monomer to the (meth)acrylic acid monomer (styrene monomer/(meth) acrylic acid monomer) is 70/30 or more and 10/90 or less (preferably 65/35 or more and 20/80 or less).

When the (meth)acrylic resin particles are cross-linked resin particles produced by using a cross-linker, the cross-linker may be a bifunctional alkyl acrylate having a C6-C12 alkylene chain, and the amount of the cross-linker relative to the total mass (100 parts by mass) of the styrene monomer, the (meth)acrylic acid monomer, and the cross-linker is, for example, preferably 0.3 parts by mass or more and 5.0 parts by mass or less, more preferably 0.5 parts by mass or more and 2.5 parts by mass or less, still more preferably 1.0 part by mass or more and 2.0 parts by mass or less.

The average primary particle size of the resin particles is preferably 50 nm or more and 500 nm or less, more preferably 20 nm or more and 300 nm or less, still more preferably 30 nm or more and 250 nm or less.

The average primary particle size of the resin particles is measured with a transmission electron microscope (TEM).

For example, JEM-2100 plus available from JEOL Ltd. can be used as a transmission electron microscope.

Specifically, the average primary particle size of the resin particles is measured by the following method.

The toner particles are cut into a thickness of about 0.1 μm with a microtome. The cross section of the toner particles is photographed with a transmission electron microscope at a magnification of 10,000×, and the equivalent circular diameter of each of 100 resin particles dispersed in the toner particles is calculated from the area of the cross section of each resin particle. The arithmetic mean of the equivalent circular diameters is used as an average primary particle size.

The amount of the resin particles relative to the toner particles is preferably 1 mass % or more and 30 mass % or less, more preferably 3 mass % or more and 25 mass % or less, still more preferably 5 mass % or more and 20 mass % or less.

Other Additives

Examples of other additives include well-known additives, such as magnetic substances, charge control agents, and inorganic powders. These additives are internal additives contained in the toner particles.

Properties of Toner Particles and Like

The toner particles may have a single-layer structure, or may each have so-called a core-shell structure including a core (core particle) and a coating layer (shell layer) coating the core.

The toner particles having a core-shell structure include, for example, a core containing a binder resin and other optional additives, such as a colorant and a release agent, and a coating layer containing a binder resin.

The volume average particle size (D50v) of the toner particles is preferably 2 μm or more and 10 μm or less, more preferably 4 μm or more and 8 μm or less.

The average particle sizes and particle size distribution indexes of the toner particles are measured by using Coulter Multisizer II (available from Beckman Coulter, Inc.) and an electrolyte ISOTON-II (available from Beckman Coulter, Inc.).

Before measurement, 0.5 mg or more and 50 mg or less of a test sample is added to 2 ml of a 5% aqueous solution of a surfactant (e.g., sodium alkylbenzene sulfonate) used as a dispersant. The resulting mixture is added to 100 ml or more and 150 ml or less of the electrolyte.

A suspension of the sample in the electrolyte is subjected to a dispersion treatment by using an ultrasonic disperser for 1 minute, and the particle size distribution of particles having a particle size in the range of 2 μm or more and 60 μm or less is measured by using Coulter Multisizer II with an aperture having a diameter of 100 μm. The number of sampled particles is 50,000.

The volume-based and number-based cumulative distributions are drawn from the smallest particle size against particle size ranges (channels) divided on the basis of the measured particle size distribution. The particle sizes at a cumulative percentage of 16% are defined as a volume particle size D16v and a number particle size D16p, the particle sizes at a cumulative percentage of 50% as a volume average particle size D50v and a cumulative number average particle size D50p, and the particle sizes at a cumulative percentage of 84% as a volume particle size D84v and a number particle size of D84p.

From these particle sizes, the volume particle size distribution index (GSDv) is calculated as $(D84v/D16v)^{1/2}$, and the number particle size distribution index (GSDp) as $(D84p/D16p)^{1/2}$.

The average circularity of the toner particles is preferably 0.90 or more and 1.00 or less, more preferably 0.92 or more and 0.98 or less.

The average circularity of the toner particles is obtained from (the circle equivalent circumference)/(the circumference)[(the circumference of a circle having the same projected area as the particle image)/(the circumference of the projected particle image)]. Specifically, the average circularity of the toner particles is determined by the following method.

First, the toner particles to be analyzed are collected by suction to form a flat flow, and particle images are captured with stroboscopic flash as still images, and the particle images are analyzed with a flow particle image analyzer (FPIA-3000 available from Sysmex Corporation) to determine the average circularity. The number of samples used to determine the average circularity is 3,500.

When the toner has external additives, the toner (developer) to be analyzed is dispersed in surfactant-containing water, and the external additives are then removed by ultrasonication to provide toner particles.

External Additives

Examples of external additives include inorganic particles. Examples of the inorganic particles include $SiO_2$, $TiO_2$, $Al_2O_3$, $SrTiO_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O(TiO_2)_n$, $Al_2O_3{\cdot}2SiO_2$, $CaCO_3$, $MgCO_3$, $BaSO_4$, and $MgSO_4$.

The surfaces of the inorganic particles used as an external additive may be hydrophobized. Hydrophobization is performed by, for example, dipping the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used singly or in combination of two or more.

The amount of the hydrophobizing agent is normally, for example, 1 part by mass or more and 10 parts by mass or less relative to 100 parts by mass of the inorganic particles.

Examples of external additives also include resin particles (resin particles made of, for example, polystyrene, polymethyl methacrylate (PMMA), and melamine resin), and cleaning active agents (e.g., higher fatty acid metal salts, such as zinc stearate, and fluoropolymer particles).

The amount of external additives externally added is, for example, preferably 0.01 mass % or more and 10 mass % or less, more preferably 0.01 mass % or more and 6.0 mass % or less relative to the toner particles.

Method for Producing Toner

Next, a method for producing a toner according to an exemplary embodiment will be described.

The toner according to the exemplary embodiment is obtained by externally adding external additives to toner particles after producing the toner particles.

The toner particles may be produced by using any one of dry production methods (e.g., a kneading-grinding method) and wet production methods (e.g., an aggregation-coalescence method, a suspension-polymerization method, and a dissolution-suspension method). The method for producing the toner particles is not limited to these production methods, and a well-known production method is employed.

Of these methods, an aggregation-coalescence method may be used to produce the toner particles.

Specifically, for example, when the toner particles are produced by using an aggregation-coalescence method, the toner particles are produced through the following steps:

- a step (first aggregated particle-forming step) of forming first aggregated particles by mixing a first resin particle dispersion containing first resin particles dispersed therein as a binder resin, a colorant dispersion containing a colorant dispersed therein, and a release agent particle dispersion containing particles of a release agent (hereinafter also referred to as "release agent particles") dispersed therein to cause aggregation of the particles and the colorant in the obtained dispersion;
- a step (second aggregated particle-forming step) of forming second aggregated particles by adding second resin particles as a binder resin to the first aggregated particle dispersion to cause aggregation of the second resin particles on the surfaces of the first aggregated particles after forming the first aggregated particle dispersion containing the first aggregated particles dispersed therein; and
- a step (fusing-coalescing step) of fusing and coalescing the second aggregated particles by heating the second aggregated particle dispersion containing the second aggregated particles dispersed therein to form toner particles.

The aggregation-coalescence method is described as a method for producing toner particles containing binder resins, a colorant, and a release agent, but the colorant and the release agent are optional components contained in the toner particles.

The details of each step will be described below.

Dispersion Preparing Step

First, each dispersion used in the aggregation-coalescence method is prepared. Specifically, the following dispersions are prepared: a first resin particle dispersion containing the first resin particles dispersed therein as a binder resin; a colorant dispersion containing the colorant dispersed therein; a second resin particle dispersion containing the second resin particles dispersed therein as a binder resin; and a release agent particle dispersion containing release agent particles dispersed therein.

In the dispersion preparing step, the first resin particles and the second resin particles are referred to as "resin particles."

The resin particle dispersion is prepared by, for example, dispersing the resin particles in a dispersion medium by using a surfactant.

Examples of the dispersion medium used in the resin particle dispersion include aqueous media.

Examples of aqueous media include water, such as distilled water and ion exchange water, and alcohols. These aqueous media may be used singly or in combination of two or more.

Examples of the surfactant include anionic surfactants, such as sulfate ester salts, sulfonate salts, phosphate esters, and soaps; cationic surfactants, such as amine salts and quaternary ammonium salts; and non-ionic surfactants, such as polyethylene glycols, alkylphenol ethylene oxide adducts, and polyhydric alcohols. Of these surfactants, in particular, anionic surfactants and cationic surfactants may be used. A non-ionic surfactant may be used in combination with an anionic surfactant or a cationic surfactant.

The surfactants may be used singly or in combination of two or more.

Examples of the method for dispersing resin particles in a dispersion medium to prepare the resin particle dispersion include ordinary dispersion methods using, for example, a rotary shear homogenizer, a ball mill having media, a sand mill, and Dyno-Mill. Depending on the type of resin particles, for example, the phase-inversion emulsification method may be used to disperse resin particles in a resin particle dispersion.

The phase-inversion emulsification method is a method for dispersing a resin in the form of particles in an aqueous medium. This method involves dissolving a target resin in a hydrophobic organic solvent capable of dissolving the resin; adding a base to an organic continuous phase (O-phase) to cause neutralization; and then adding an aqueous medium (W-phase) to cause resin conversion (so called phase inversion) from W/O to O/W, forming a discontinuous phase.

The volume average particle size of resin particles dispersed in the resin particle dispersion is preferably, for example, 0.01 μm or more and 1 μm or less, more preferably 0.08 μm or more and 0.8 μm or less, still more preferably 0.1 μm or more and 0.6 μm or less.

The volume average particle size of the resin particles is determined as follows: drawing the volume-based cumulative distribution from the smallest particle size as a function of divided particle size ranges (channels) of the particle size distribution measured with a laser diffraction particle size distribution analyzer (e.g., LA-700 available from Horiba Ltd.); and defining the particle size at 50% cumulative volume with respect to all particles as a volume average particle size D50v. The volume average particle size of the particles in other dispersions is measured similarly.

The amount of the resin particles contained in the resin particle dispersion is, for example, preferably 5 mass % or more and 50 mass % or less, more preferably 10 mass % or more and 40 mass % or less.

Similarly to the resin particle dispersion, for example, the colorant dispersion and the release agent particle dispersion are also prepared. Specifically, the volume average particle size of the particles, the dispersion medium, the dispersion method, and the amount of the particles for the resin particle dispersion are the same as those for the colorant dispersed in the colorant dispersion and the release agent particles dispersed in the release agent particle dispersion.

First Aggregated Particle-Forming Step

Next, the first resin particle dispersion, the colorant dispersion, and the release agent particle dispersion are mixed.

The first resin particles, the colorant, and the release agent particles are subjected to hetero-aggregation in the mixed dispersion to form first aggregated particles containing the first resin particles, the colorant, and the release agent particles.

Specifically, for example, the first aggregated particles are formed as follows: adding an aggregating agent to a dispersion prepared by mixing the first resin particle dispersion, the colorant dispersion, and the release agent particle dispersion, and adjusting the pH of the mixed dispersion to the acidic side (e.g., pH 2 or higher and pH 5 or lower); and after adding a dispersion stabilizer as desired, bringing the temperature into a range of 20° C. or higher and 50° C. or lower to cause aggregation of the particles dispersed in the mixed dispersion.

The first aggregated particle-forming step may involve, for example, adding the aggregating agent to the mixed dispersion at room temperature (e.g., 25° C.) under stirring with a rotary shear homogenizer, and adjusting the pH of the mixed dispersion to the acidic side (e.g., pH 2 or higher and pH 5 or lower), and after adding a dispersion stabilizer as desired, heating the mixed dispersion as described above.

Examples of the aggregating agent include surfactants having polarity opposite to the polarity of the surfactant used as a dispersant added to the mixed dispersion, inorganic metal salts, and divalent or higher valent metal complexes. In particular, the use of a metal complex as an aggregating agent may reduce the amount of the surfactant used and may improve charging characteristics.

An additive that forms complexes or similar bonds with the metal ions of the aggregating agent may be used as desired. The additive may be a chelator.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelator may be a water-soluble chelator. Examples of the chelator include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelator added is, for example, preferably 0.01 parts by mass or more and 5.0 parts by mass or less, more preferably 0.1 parts by mass or more and less than 3.0 parts by mass, relative to 100 parts by mass of the first resin particles.

Second Aggregated Particle-Forming Step

Next, the second resin particle dispersion containing the second resin particles dispersed therein is added to the first aggregated particle dispersion after forming the first aggregated particle dispersion containing the first aggregated particles dispersed therein.

The second resin particles may be the same as or different from the first resin particles.

The second resin particles then aggregate on the surfaces of the first aggregated particles in a dispersion of the first aggregated particles and the second resin particles. At this time, the release agent particle dispersion may be added to cause aggregation of the second resin particles and the release agent particles on the surfaces of the first aggregated particles. Specifically, for example, when the first aggregated particles reach an intended particle size in the first aggregated particle-forming step, the second resin particle dispersion is added to the first aggregated particle dispersion, and heating is performed at a temperature higher than or equal to the glass transition temperature of the second resin particles.

The progress of aggregation is then stopped by, for example, adjusting the pH of the dispersion to the range of 6.5 or higher and 8.5 or lower.

Accordingly, the second aggregated particles in which the second resin particles aggregate so as to adhere to the surfaces of the first aggregated particles are obtained.

Fusing-Coalescing Step

Next, the second aggregated particle dispersion containing the second aggregated particles dispersed therein is heated to, for example, a temperature not lower than the glass transition temperatures of the first and second resin particles (e.g., a temperature higher than the glass transition temperatures of the first and second resin particles by 10° C. to 30° C., or higher) to cause fusion and coalescence of the second aggregated particles and thus to form toner particles.

The toner particles are produced through the steps described above.

In the aggregation-coalescence method described above, the toner particles may be formed by fusing and coalescing the first aggregated particles without performing the second aggregated particle-forming step. The second aggregated particle-forming step may be repeated multiple times.

After completion of the fusing-coalescing step, the toner particles formed in the solution are subjected to a known washing step, a known solid-liquid separation step, and a known drying step to produce dry toner particles.

The washing step may involve sufficient displacement washing with ion exchange water in view of charging characteristics. The solid-liquid separation step is not limited and may involve, for example, suction filtration or pressure filtration in view of productivity. The drying step is not limited and may involve, for example, freeze drying, flush drying, fluidized bed drying, or vibratory fluidized bed drying in view of productivity.

The toner according to the exemplary embodiment is produced by, for example, adding external additives to the obtained dry toner particles and mixing them. Mixing may be performed with, for example, a V-blender, a Henschel mixer, or a Lodige mixer. In addition, coarse toner particles may be removed with a vibratory sieving machine, a wind power sieving machine, or other machines, as desired.

Electrostatic Charge Image Developer

An electrostatic charge image developer according to an exemplary embodiment contains at least the toner according to the exemplary embodiment.

The electrostatic charge image developer according to the exemplary embodiment may be a one-component developer containing only the toner according to the exemplary embodiment, or may be a two-component developer formed by mixing the toner and a carrier.

The carrier is not limited, and may be a known carrier. Examples of the carrier include a coated carrier obtained by coating, with a coating resin, the surface of a core made of magnetic powder; a magnetic powder-dispersed carrier in which a magnetic powder is dispersed and mixed in a matrix resin; and a resin-impregnated carrier in which a porous magnetic powder is impregnated with a resin.

The magnetic powder-dispersed carrier and the resin-impregnated carrier may be carriers in which particles constituting the carrier, which serve as cores, are coated with a coating resin.

Examples of the magnetic powder include powders made of magnetic metals, such as iron, nickel, and cobalt; and powders made of magnetic oxides, such as ferrite and magnetite.

Examples of the coating resin and the matrix resin include styrene-(meth)acrylate resin; polyolefin resins, such as polyethylene resin and polypropylene resin; polyvinyl or polyvinylidene resins, such as polystyrene, (meth)acrylic resin, polyacrylonitrile, polyvinyl acetate, polyvinyl alcohol, polyvinyl butyral, polyvinyl chloride, polyvinylcarbazole, polyvinyl ether, and polyvinylketone; vinyl chloride-vinyl acetate copolymer; straight silicone resin having organosiloxane bonds, and modified products thereof; fluororesins, such as polytetrafluoroethylene, polyvinyl fluoride, polyvinylidene fluoride, and polychlorotrifluoroethylene; polyester; polyurethane; polycarbonate; amino resins, such as urea-formaldehyde resin; and epoxy resin.

The coating resin and the matrix resin may contain a (meth)acrylic resin. The amount of the (meth)acrylic resin is preferably 50 mass % or more relative to the total mass of the resin, more preferably 80 mass % or more relative to the total mass of the resin.

In particular, the coating resin and the matrix resin may contain an alicyclic (meth)acrylic resin as a (meth)acrylic resin.

The coating resin and the matrix resin may contain other additives, such as conductive particles.

Examples of the conductive particles include particles made of metals, such as gold, silver, and copper; and particles made of carbon black, titanium oxide, zinc oxide, tin oxide, barium sulfate, aluminum borate, and potassium titanate.

The surface of the core is coated with resin by, for example, a coating method using a coating layer-forming solution in which a coating resin and various optional additives are dissolved in an appropriate solvent. The solvent is not limited and may be selected in consideration of the coating resin used, coating suitability, and the like.

Specific examples of the resin coating method include an immersion method that involves immersing the core in the coating layer-forming solution; a spray method that involves spraying the coating layer-forming solution onto the surface of the core; a fluidized bed method that involves spraying the coating layer-forming solution onto the core while floating the core in air flow; and a kneader-coater method that involves mixing the core of the carrier and the coating layer-forming solution in a kneader-coater, and then removing the solvent.

The mixing ratio (mass ratio) of the toner to the carrier in the two-component developer is preferably from 1:100 to 30:100 (=toner:carrier), more preferably from 3:100 to 20:100.

EXAMPLES

The present disclosure will be described below in more detail by way of Examples and Comparative Examples, but the present disclosure is not limited to these Examples.

Preparation of Amorphous Resin Particle Dispersion 1

Terephthalic acid: 98 parts by mole

Trimellitic anhydride: 2 parts by mole

Ethylene oxide 2-mol adduct of Bisphenol A: 20 parts by mole

Propylene oxide 2-mol adduct of Bisphenol A: 80 parts by mole

The materials described above are placed in a reaction vessel equipped with a stirrer, a nitrogen inlet tube, a temperature sensor, and a fractionating column. The temperature is increased to 190° C. over 1 hour, and 1.2 parts of dibutyltin oxide is added to 100 parts of the above materials. While generated water is distilled off, the temperature is increased to 240° C. over 6 hours and maintained at 240° C. to continue the dehydration condensation reaction for 3 hours. The reaction product is then cooled.

The reactants are transferred in a molten state to Cavitron CD1010 (available from Eurotech) at a rate of 100 g/min. At the same time, separately prepared aqueous ammonia with a concentration of 0.37 mass % is transferred to Cavitron CD1010 at a rate of 0.1 L/min while heated to 120° C. in a heat exchanger. Cavitron CD1010 is operated at a rotor rotation speed of 60 Hz and a pressure of 5 $kg/cm^2$ to provide a resin particle dispersion containing resin particles with a volume average particle size of 160 nm dispersed therein. The solid content of the resin particle dispersion is adjusted to 20 mass % by adding ion exchange water to the resin particle dispersion to provide an amorphous resin particle dispersion 1.

Preparation of Crystalline Resin Particle Dispersion

Sebacic acid: 202 parts by mass

Ethylene glycol: 62 parts by mass

The materials described above are placed in a reaction vessel equipped with a stirrer, a nitrogen inlet tube, a temperature sensor, and a fractionating column. The temperature is increased to 160° C. over 1 hour, and 0.8 parts by mass of dibutyltin oxide is added. While generated water is distilled off, the temperature is increased to 180° C. over 6 hours and maintained at 180° C. for 5 hours to continue the dehydration condensation reaction. Subsequently, the temperature is gradually increased to 230° C. under reduced pressure and maintained at 230° C. under stirring for 2 hours. The reactants are then cooled. After cooling, solid-liquid separation is performed, and the solid material is dried to provide a crystalline polyester resin.

Crystalline polyester resin: 100 parts

Methyl ethyl ketone: 40 parts

Isopropyl alcohol: 30 parts

10% Ammonia aqueous solution: 6 parts

The materials described above are added to a 3-L jacketed reaction vessel (BJ-30N available from Tokyo Rikakikai Co., Ltd.) equipped with a condenser, a thermometer, a dropping device, and an anchor blade, and mixed by stirring at 100 rpm to dissolve the resin while the temperature is maintained at 80° C. in a water-circulation thermostatic bath. Subsequently, the water-circulation thermostatic bath is set to 50° C., and total 400 parts of ion exchange water kept at 50° C. is added dropwise at a rate of 7 parts by mass/min to cause phase inversion and thus to form an emulsion. To a 2-L-recovery flask are added 576 parts by mass of the emulsion and 500 parts by mass of ion exchange water. The recovery flask is set in an evaporator (available from Tokyo Rikakikai Co., Ltd.) equipped with a vacuum control unit via an anti-splash trap. The solvent is removed by heating the recovery flask in a heating bath at 60° C. and reducing the pressure to 7 kPa with attention paid to bumping while rotating the recovery flask. Ion exchange water is then added to provide a crystalline resin particle dispersion having a solid concentration of 20 mass %.

Preparation of Styrene (Meth)Acrylic Resin Particle Dispersion 1

Preparation of Emulsion A

Styrene: 45 parts n-Butyl acrylate: 53 parts

Divinylbenzene: 2 parts

The materials described above are placed in a mixing vessel equipped with a stirrer, followed by stirring. A mixed solution containing 1.5 parts of anionic surfactant (SS-H available from Kao Corporation) and 98.5 parts of ion exchange water is added to the mixing vessel and stirred to prepare an emulsion A.

Preparation of Emulsion B

Styrene: 45 parts n-Butyl acrylate: 54 parts

Divinylbenzene: 1 part

The materials described above are placed in a mixing vessel equipped with a stirrer, followed by stirring. A mixed solution containing 1.5 parts of anionic surfactant (SS-H available from Kao Corporation) and 98.5 parts of ion exchange water is added to the mixing vessel and stirred to prepare an emulsion B.

Preparation of Styrene (Meth)Acrylic Resin Particle Dispersion 1

To a reaction vessel equipped with a stirrer and a nitrogen inlet tube are added 2.0 parts of anionic surfactant (SS-H available from Kao Corporation) and 300 parts of ion exchange water, followed by stirring. The emulsion A (50 parts) is added. The reaction vessel is purged with nitrogen, and the reaction solution is heated to a temperature of 75° C. in an oil bath under stirring. In addition, 10 parts of ammonium persulfate having a concentration of 10 mass % is added, and the resulting mixture is held for 30 minutes.

Subsequently, 150 parts of the emulsion A is gradually added dropwise to the reaction vessel over 60 minutes ("drop time A" described below) by using a pump while the temperature of the reaction solution is maintained at 75° C. After completion of dropwise addition, the temperature of the reaction solution is changed to 70° C. and held for 15 minutes. While the temperature ("polymerization temperature B" described below) of the reaction solution is maintained at 70° C., 200 parts of the emulsion B is added dropwise over 120 minutes ("drop time B" described below). After completion of dropwise addition, 3 parts of ammonium persulfate having a concentration of 10 mass % is added, and the resulting mixture is held for 2 hours and then cooled to room temperature.

Furthermore, ion exchange water is added such that the solid concentration becomes 20% to provide a styrene (meth) acrylic resin particle dispersion 1.

Preparation of Colorant Dispersion

Carbon black (Regal 330 available from Cabot Corporation): 50 parts

Anionic surfactant Neogen RK (available from DKS Co. Ltd.): 5 parts

Ion exchange water: 192.9 parts

The components described above are mixed and processed at 240 MPa by using Ultimaizer (available from Sugino Machine Limited) for 10 minutes to prepare a colorant dispersion (solid concentration: 20%).

Preparation of Release Agent Dispersion 1

Fischer-Tropsch wax (FNP 0090 available from Nippon Seiro Co., Ltd., melting temperature Tw: 90° C.): 50 parts Anionic surfactant (Neogen RK available from DKS Co. Ltd.): 1 part Ion exchange water: 200 parts The materials described above are mixed and heated to 130° C. The mixture is dispersed by using a homogenizer (ULTRA-TURRAX T50 available from IKA) and then dispersed by using a Manton-Gaulin high-pressure homogenizer (available from Gaulin Corporation) to form a release agent dispersion (solid content 20 mass %) containing release agent particles dispersed therein. The volume average particle size of the release agent particles is 180 nm.

Preparation of Developers 1 to 3

Amorphous resin particle dispersion 1:225 parts

Crystalline resin particle dispersion: 25 parts

Styrene (meth)acrylic resin particle dispersion 1:60 parts

Colorant Dispersion: 30 parts

Release agent dispersion 1:30 parts

Ion exchange water: 100 parts

The materials described above are placed in a reaction vessel equipped with a thermometer, a pH meter, and a stirrer, externally heated to a temperature of 30° C. in a mantle heater, and kept for 30 minutes under stirring at a number of rotation of 150 rpm. Next, the pH is adjusted to 3.0 by addition of a 0.3 N nitric acid aqueous solution, and a 3 mass % polyaluminum chloride aqueous solution is added while the materials are dispersed with a homogenizer (IKA Ultra Turrax T50). The temperature is then heated to 50° C. and kept for 30 minutes under stirring. Next, 130 parts of the amorphous resin particle dispersion 1 is added and kept for 1 hour, and the pH is adjusted to 8.5 by addition of a 0.1 N sodium hydroxide aqueous solution. The temperature is then increased to 85° C. while stirring continues, and the temperature is kept for 5 hours. Next, cooling, solid-liquid separation, and solid washing and drying are sequentially performed to provide toner particles 1 having a volume average particle size of 4.8 μm and a shape factor of 0.969.

Similarly, the temperature is increased to 85° C. and kept for 4 hours to provide toner particles 2 having a volume average particle size of 4.5 μm and a shape factor of 0.958.

Similarly, the temperature is increased to 85° C. and kept for 6.5 hours to provide toner particles 3 having a volume average particle size of 5.0 μm and a shape factor of 0.975.

Each of the obtained toner particles 1 to 3 (100 parts) is mixed with 0.7 parts of dimethyl silicone oil-treated silica particles (RY200 available from Japan Aerosil Co., Ltd.) by using a Henschel mixer to provide a toner.

The obtained toner (8 parts) is mixed with 100 parts of the carrier to provide a developer 1.

Preparation of Carrier

Ferrite particles (average particle size 35 μm) 100 parts

Toluene 14 parts

Styrene/methyl methacrylate copolymer (copolymerization ratio 15/85) 3 parts

Carbon black 0.2 parts

The components describe above other than the ferrite particles are dispersed by a sand mill to prepare a dispersion. The dispersion and the ferrite particles are placed in a vacuum degassing kneader and dried under reduced pressure with stirring to provide a carrier.

Examples 1 to 7, Comparative Example 1

The developer shown in Table 1 is accommodated in a developing device in a modified machine of an image forming apparatus "Color 1000i Press available from FUJIFILM Business Innovation Corp."

The developing device has the same structure as shown in FIG. 3 and is modified so as to independently control the frequencies of the AC voltages applied to two developing members (i.e., developing sleeves).

The development conditions (DC voltage, and AC voltage superimposed on DC voltage and frequency thereof) when the toner image has an area coverage of 40% or less in the image forming apparatus are set as described in Table 1 to provide an image forming apparatus of each Example.

The development conditions when the toner image has an area coverage of 40% or less, except for Comparative Example 1, are set as follows: when the toner image has an area coverage of more than 40%, the frequency of the AC voltage of the developing voltage applied to the second developing roller is reduced from a state where the development conditions of the first developing roller are the same as those of the second developing roller, so that the AC voltage of the developing voltage applied to the second developing roller has a lower frequency than the AC voltage of the developing voltage applied to the first developing roller.

Evaluation

Fine Line Reproducibility

One thousand sheets of a chart with an area coverage of 1% are passed in an environment with a temperature of 30° C. and a relative humidity of 88% by the image forming apparatus of each Example under the development conditions set as described in Table 1, and an 1 on-1 off image (an image with an area coverage of 5% in which one-dot lines are arranged in parallel at one-dot intervals) having a resolution of 2,400 dpi (dot per inch: the number of dots per 2.54 cm) is then outputted as a 5 cm×5 cm chart. The image is evaluated on the basis of the following criteria.

A: No missing or blurred lines are present.

B: Some missing or blurred lines are observed, but they are little and practically acceptable.

C: Missing or blurred lines are observed and practically unacceptable.

TABLE 1

| | Development conditions when the toner image has an area coverage of 40% or less | | | | | | | Developer | | | |
|---|---|---|---|---|---|---|---|---|---|---|---|
| | First developing roller | | | Second developing roller | | | | | | | |
| | DC voltage | AC voltage | | DC voltage | AC voltage | | | | Toner | Resin | |
| | voltage value V | voltage value V | frequency Fd kHz | voltage value V | voltage value V | frequency Fu kHz | Ratio (Fd/Fu) | Type | adhesion force Unit | particle size nm | Evaluation Fine line reproducibility |
| Example 1 | 300 | 1000 | 12 | 300 | 1000 | 3 | 4.0 | 1 | 11 | 160 | A |
| Example 2 | 300 | 1000 | 12 | 300 | 1000 | 7 | 1.7 | 1 | 11 | 160 | B |
| Example 3 | 300 | 1000 | 12 | 300 | 1000 | 6 | 2.0 | 1 | 11 | 160 | A |
| Example 4 | 300 | 1000 | 12 | 300 | 1000 | 1.3 | 9.0 | 1 | 11 | 160 | A |
| Example 5 | 300 | 1000 | 12 | 300 | 1000 | 1.2 | 10.0 | 1 | 11 | 160 | B |
| Example 6 | 300 | 1000 | 12 | 300 | 1000 | 3 | 4.0 | 2 | 15 | 160 | A |
| Example 7 | 300 | 1000 | 12 | 300 | 1000 | 3 | 4.0 | 3 | 5 | 160 | A |
| Comparative Example 1 | 300 | 1000 | 12 | 300 | 1000 | 12 | 1 (Fd = Fu) | 1 | 11 | 160 | C |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An image forming apparatus including:

an electrophotographic photoreceptor;

a charging device that charges a surface of the electrophotographic photoreceptor;

an electrostatic charge image-forming device that forms an electrostatic charge image on the charged surface of the electrophotographic photoreceptor;

a developing device that stores a developer containing a toner, and supplies the developer to develop the electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in a rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage;

a transfer device that transfers the toner image on the surface of the electrophotographic photoreceptor to a surface of a recording medium;

a fixing device that fixes the toner image to the surface of the recording medium; and a control device that acquires image information regarding the toner image, and controls at least one of the first power source and the second power source according to the image information such that the AC voltage of the developing voltage applied to the second developing member has a lower frequency than the AC voltage of the developing voltage applied to the first developing member.

(((2))) The image forming apparatus according to (((1))), wherein the control device controls the second power source to reduce the frequency of the AC voltage of the developing voltage applied to the second developing member such that the AC voltage of the developing voltage applied to the second developing member has a lower frequency than the AC voltage of the developing voltage applied to the first developing member.

(((3))) The image forming apparatus according to (((1))) or (((2))), wherein the control device controls at least one of the first power source and the second power source such that a ratio (Fd/Fu) of a frequency Fd of the AC voltage of the developing voltage applied to the first developing member to a frequency Fu of the AC voltage of the developing voltage applied to the second developing member is 2.0 or more and 9.0 or less.

(((4))) The image forming apparatus according to any one of (((1))) to (((3))), wherein the control device acquires an area coverage of the toner image and controls at least one of the first power source and the second power source.

(((5))) The image forming apparatus according to any one of (((1))) to (((4))), wherein the toner has an adhesion force of 5 MPa or more and 15 MPa or less.

(((6))) The image forming apparatus according to (((5))), wherein the toner has toner particles containing a binder resin and resin particles.

(((7))) The image forming apparatus according to (((6))), wherein an amount of the resin particles is 3 mass % or more and 25 mass % or less relative to the toner particles.

(((8))) The image forming apparatus according to (((6))) or (((7))), wherein the resin particles are made of a styrene (meth)acrylic resin.

(((9))) The image forming apparatus according to any one of (((6))) to (((8))), wherein the resin particles have an average primary particle size of 20 nm or more and 300 nm or less.

What is claimed is:

1. An image forming apparatus comprising:

an electrophotographic photoreceptor;

a charging device that charges a surface of the electrophotographic photoreceptor;

an electrostatic charge image-forming device that forms an electrostatic charge image on the charged surface of the electrophotographic photoreceptor;

a developing device that stores a developer containing a toner, and supplies the developer to develop the electrostatic charge image on the surface of the electrophotographic photoreceptor into a toner image, wherein the developing device has: a first developing member that is disposed to face the electrophotographic photoreceptor, holds the developer, and transports the developer to a development region; a second developing member that is disposed downstream of the first developing member in a rotation direction of the electrophotographic photoreceptor so as to face the electrophotographic photoreceptor, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage;

a transfer device that transfers the toner image on the surface of the electrophotographic photoreceptor to a surface of a recording medium;

a fixing device that fixes the toner image to the surface of the recording medium; and a control device that acquires image information regarding the toner image, and controls at least one of the first power source and the second power source according to the image information such that the AC voltage of the developing voltage applied to the second developing member has a lower frequency than the AC voltage of the developing voltage applied to the first developing member.

2. The image forming apparatus according to claim 1, wherein the control device controls the second power source to reduce the frequency of the AC voltage of the developing voltage applied to the second developing member such that the AC voltage of the developing voltage applied to the second developing member has a lower frequency than the AC voltage of the developing voltage applied to the first developing member.

3. The image forming apparatus according to claim 1, wherein the control device controls at least one of the first power source and the second power source such that a ratio (Fd/Fu) of a frequency Fd of the AC voltage of the developing voltage applied to the first developing member to a frequency Fu of the AC voltage of the developing voltage applied to the second developing member is 2.0 or more and 9.0 or less.

4. The image forming apparatus according to claim 1, wherein the control device acquires an area coverage of the toner image and controls at least one of the first power source and the second power source.

5. The image forming apparatus according to claim 1, wherein the toner has an adhesion force of 5 MPa or more and 15 MPa or less.

6. The image forming apparatus according to claim 5, wherein the toner has toner particles containing a binder resin and resin particles.

7. The image forming apparatus according to claim 6, wherein an amount of the resin particles is 3 mass % or more and 25 mass % or less relative to the toner particles.

8. The image forming apparatus according to claim 6, wherein the resin particles are made of a styrene (meth) acrylic resin.

9. The image forming apparatus according to claim 6, wherein the resin particles have an average primary particle size of 20 nm or more and 300 nm or less.

10. An image forming apparatus comprising:

electrophotographic photoreceptor means;

charging means for charging a surface of the electrophotographic photoreceptor means;

electrostatic charge image-forming means for forming an electrostatic charge image on the charged surface of the electrophotographic photoreceptor means;

developing means for storing a developer containing a toner, and supplying the developer to develop the electrostatic charge image on the surface of the electrophotographic photoreceptor means into a toner image, wherein the developing means has: a first developing member that is disposed to face the electrophotographic photoreceptor means, holds the developer, and transports the developer to a development region; a second developing member that is disposed downstream of the first developing member in a rotation direction of the electrophotographic photoreceptor means so as to face the electrophotographic photoreceptor means, holds the developer, and transports the developer to a development region; a first power source that applies, to the first developing member, a developing voltage obtained by superimposing an AC voltage on a DC voltage; and a second power source that applies, to the second developing member, a developing voltage obtained by superimposing an AC voltage on a DC voltage;

transfer means for transferring the toner image on the surface of the electrophotographic photoreceptor means to a surface of a recording medium;

fixing means for fixing the toner image to the surface of the recording medium; and control means for acquiring image information regarding the toner image, and controlling at least one of the first power source and the second power source according to the image information such that the AC voltage of the developing voltage applied to the second developing member has a lower frequency than the AC voltage of the developing voltage applied to the first developing member.

* * * * *